United States Patent [19]
Clampitt et al.

[11] 3,757,863
[45] Sept. 11, 1973

[54] SECONDARY RECOVERY METHODS

[75] Inventors: Richard L. Clampitt, Bartlesville, Okla.; James E. Curzon, Great Bend, Kans.

[73] Assignee: Phillips Petroleum Company, Bartlesville, Okla.

[22] Filed: Dec. 27, 1971

[21] Appl. No.: 212,688

[52] U.S. Cl................. 166/307, 166/270, 166/271, 166/273
[51] Int. Cl........................ E21b 43/22, E21b 43/27
[58] Field of Search................... 166/307, 271, 273, 166/270, 294, 295

[56] References Cited
UNITED STATES PATENTS

| | | | |
|---|---|---|---|
| 3,611,733 | 10/1971 | Eilers et al. | 166/294 X |
| 3,634,237 | 1/1972 | Crenshaw et al. | 166/307 X |
| 3,482,631 | 12/1969 | Jones | 166/273 |
| 3,437,141 | 4/1969 | Brandner et al. | 166/273 |
| 3,581,824 | 6/1971 | Hurd | 166/273 X |
| 3,625,284 | 12/1971 | Gogarty et al. | 166/273 |
| 3,380,529 | 4/1968 | Hendrickson | 166/295 |
| 3,415,319 | 12/1968 | Gibson | 166/295 |
| 3,396,790 | 8/1968 | Eaton | 166/270 |
| 3,121,462 | 2/1964 | Martin et al. | 166/288 |
| 3,308,885 | 3/1967 | Sandiford | 166/295 |

*Primary Examiner*—Stephen J. Novosad
*Attorney*—Quigg & Oberlin

[57] ABSTRACT

A method for reducing the quantity of water recovered from a subterranean formation which is penetrated by at least one well bore wherein prolonged mobility control and/or plugging is maintained through increased thickener agent adsorption on oil bearing formation surfaces; comprising the steps of treating the formation with an acid, a neutralizing brine, and at least one slug of thickened aqueous solutions.

9 Claims, No Drawings

SECONDARY RECOVERY METHODS

This invention relates to the secondary recovery of petroluem fluids from subterranean formations. In another aspect this invention relates to the reduction in the quantity of water recovered from a subterranean formation. In yet another aspect this invention relates to prolonging mobility control and/or plugging of a subterranean formation through increasing polymer absoprtion on oil formation surfaces achieved through acidizing, brine neutralization, and thickened aqueous solution treatment steps.

Heretofore, it has been recognized that the recovery of hydrocarbons from subterranean formations is relatively inefficient with respect to the quantity of oil remaining unrecovered in the oil-bearing subterranean strata. Various secondary methods of increasing oil recovery have been practiced, including the well-known technique of injecting water into the formation through an injection well to drive additional oil toward one or more production wells spaced apart from the injection well. Although an additional quantity of oil can be recovered by water flooding techniques, the efficiency of the waterflood and ultimate hydrocarbon recovery can be further improved by the addition of various known thickening agents. These thickening agents reduce the water mobility and/or plug formations thereby preventing fingering of the flood water through the more permeable zones of the oil bearing strata. Even though improved performance can be attained by the use of the aforementioned thickening agents for mobility control and/or plugging, undesired fingering of the water within the hydrocarbon producing strata is not completely eliminated and formation sweep efficiencies are not improved to the extent desired.

It is highly desirable to decrease the volume of water produced from oil and/or gas wells. But, by decreasing the flow rate of water into the well bore without decreasing the flow rate of hydrocarbons, another beneficial effect is obtained in that, at a given pumping rate, there will be a lower liquid level over the pump of the well bore, thus reducing back pressure in the formation and improving pumping efficiency and net daily oil production.

Undesired water recovered from well bore penetrated subterranean formations can result from the infiltration of naturally occurring subterranean water or, in the case of waterflood projects, from injected water. Either source of water leads to lowered efficiency and producing the desired hydrocarbons from the formation. In the application of waterflooding to hydrocarbon reservoirs, poor sweep efficiency often leads to disappointing results. Solutions of water thickeners have been developed, but these thickened solutions are expensive and do not yield effective permeability reduction of desired permanence.

It is an object of the invention to provide a method for reducing the quantity of water produced from a well bore penetrated, subterranean formation. It is another object of this invention to provide a method for effectively reducing the subterranean formation permeability to desired permanence with a minimum amount of aqueous thickened solution. It is a further object of this invention to provide a method of prolonging mobility control and/or plugging of a subterranean formation through increased thickening agent adsorption on the formation surfaces.

These and related objects will be apparent from the following description, and can be reailized in accordance with the method of the invention which provides an increased thickener agent adsorption on hydrocarbon-bearing subterranean formation surfaces. The formation surfaces are treated with acid solutions followed with a brine slug treatment in order to raise the pH to normal levels. Following the acidizing and neutralization steps, at least one slug of thickened aqueous solution is injected into the formation for the purpose of providing prolonged mobility control and/or plugging which is enhanced by the increased thickening agent adsorption on the subterranean formation surfaces.

Secondary recovery can be improved by the method of the invention through the removal of residual oil and rendition of the formation surfaces more water wet by injection of acid slugs followed by sufficient brine for the purpose of raising the pH to near neutral levels, and finally the injection of thickened aqueous solution. The pretreatment, comprised of acidizing the subterranean formation surfaces with acids, increases the amount of polymer adsorption which coats the subterranean formation surfaces, thereby causing greater and longer lasting reductions in permeability to water. The acid pretreatment removes iron scale deposits on the walls of the well bore casing and tubing perforations. The acid converts the iron to $Fe^{3+}$ which will be displaced into the formation. The $Fe^{3+}$ ions, when brought into contact with the thickened aqueous solution promote crosslinking of the thickener molecules and result in further thickening or gelling in situ.

The various known thickening agents which can be applied by the method of this invention include thickened aqueous solutions of fatty acid soaps, sucrose, glycerin, and a number of water-soluble polymers. These water-soluble thickening agents include modified starches, Xanthum gum obtained by the fermentation of starch-derived sugar (polysaccharides), alkyl and hydroalkyl cellulose derivatives, carboxylmethyl cellulose, polyvinyl alcohol, polyvinyl pyrrolidone, polyacrylic acid, polyacrylamide, polystyrene sulfonates, ethylene-oxide polymers, the various homologs of these polymers, and copolymers of two or more of these materials or copolymers of the aforementioned polymers with other polymeric substances. Partially hydrolyzed polyacrylamides having a molecular weight in excess of $1.0\times10^6$ and having from about 3 to about 85 percent of the amide groups thereof hydrolyzed to carboxyl groups are preferred thickening agents according to the method of the invention. Other preferred thickening agents include polysaccharides and carboxylmethyl cellulose.

Periodically, or on occasion, hydrocarbon production from an oil-bearing reservoir in a subterranean formation penetrated by a well bore is sought to be stimulated. When such reservoir comprises carbonate rock, e.g., lime-stone, dolomite, or sandstone containing streaks or striations of such rock, an acid composition, e.g., a 1 to 30 percent by weight solution of an acid such as hydrochloric, hydrofluoric, sulfuric, nitric, phosphoric, acetic, tartaric, oxalic, citric, sulfamic, or a mixture of two or more acids, is often injected therein which chemically reacts with the carbonate content of the rock, etching and cleaning the rock surfaces, thereby promoting increased thickener agent adsorption.

The in situ crosslinking and gelation of the thickening agents when placed in contact with the subterranean formation will produce greater reductions in the permeability to water. The acid solution will dissolve portions of the subterranean formation surfaces, thereby producing calcium and magnesium ions such as $Ca^{++}$ and $Mg^{++}$, further enhancing the crosslinking phenomena of the thickening agent molecules and promoting adsorption of the thickened material upon the exposed surfaces. The utility of $Ca^{++}$ and $Mg^{++}$, and other multivalent cations can be incorporated further to produce a higher degree of crosslinking and gelation of the thickening agents. By exposing more of the formation surface to the thickening agent, an increased absorption and a more permanent reduction in permeability to water result. The exposure of a polymer to a freshly cleaned or acidized rock surface provides an adsorption bonding of the polymer with the rock surface which is more difficult to remove than the bonding of polymers to normally existing waterflood or plugging recovery surfaces. The ultimate effect achieved utilzing the method of the invention produces a higher and more sustained residual resistance factor per unit volume of polymer injected.

Metal compounds which can be used in the practice of the invention are water-soluble compounds of polyvalent metals wherein the metal is present in a valent state which is capable of being reduced to a lower polyvalent state. Examples of such compounds include potassium permanganate, sodium permanganate, ammonium chromate, ammonium dichromate, the alkali metal chromates, the alkali metal dichromates, and chromium trioxide. Sodium dichromate and potassium dichromate, because of availability, are the presently preferred metal-containing compounds for use as an additinal crosslinking or gelation cation. The hexavalent chromium in the chromium compounds is reduced in situ to trivalent chromium by suitable reducing agents, as discussed hereinbelow. In the permanganate compounds, for example, the manganese is reduced from +7 valence to +4 valence as in the compound MnO.

Suitable reducing agents which can be used in the practice of the invention include sulfur-containing compounds such as sodium sulfite, sodium hydrosulfite, sodium metabisulfite, potassium sulfite, sodium bisulfite, potassium metabisulfite, sodium sulfide, sodium thiosulfate, thioactamide; and nonsulfur-containing compounds such as hydroquinone, ferrous chloride, t-hydrazinobenzoic acid, hydrazine phosphite, and hydrazine dichlorate. Some of the above reducing agents act more quickly than others, for example, sodium thiosulfate usually reacts slowly in the absence of heat, e.g., requiring heat up to about 125°–130°F. The preferred reducing agents are sodium hydrosulfite or potassium hydrosulfite.

Brines utilized in the present invention can contain a wide range of dissolved solids content, e.g., from 850, 1,200, 6,000, 90,000 and 170,000 ppm dissolved solids. Crosslinking or gelatin rates are frequently expedited when using the aforementioned brines. These oil field brines commonly contain varying amounts of sodium chloride, calcium chloride, magnesium chloride, etc. Sodium chloride is usually present in the greatest concentration. The word "water" is used generically herein and in the claims, unless otherwise specified, to include such brines, fresh water and other aqueous media which can be used in accordance with the present invention.

For the purpose of this invention, residual resistance factor will be defined as the mobility to brine before thickener, divided by the mobility to brine after thickener, and resistance factor will be defined as the mobility to brine before polymer, divided by the mobility to polymer solution. Resistance factor is of interest during injection while residual resistance factor demonstrates the final results after injection applications. In the application of waterflooding projects, the extent of the water diversion depends upon the magnitude of the residual resistance factor wherein the higher the residual resistance factor the more water is diverted from the high permeability zones into the lower permeability zones. The duration of the water diversion depends upon the duration of the high value of residual resistance factor. The increased residual resistance factor will increase the degree of water diversion as long as the factor is maintained, thereby determining the duration of the water diversion.

In the application of oil-producing wells, the magnitude of the decrease in the producing water-to-hydrocarbon ratio depends upon the magnitude of the residual resistance factor. The duration of the decreased water-to-hydrocarbon ratio depends upon the duration of a high value of residual resistance factor. The method and materials used to carry out the invention can also be applied to workovers of producing wells. Workover fluids are generally fresh water-based muds with additives to give increased viscosty, water loss, lubricity, and other desirable characteristics.

The invention provides a method for reducing the quantity of water recovered from a subterranean formation which is penetrated by at least one well bore, comprising: injecting into the formation through a well bore an acid solution slug comprised of an acid selected from the group consisting of hydrofluoric, hydrochloric, nitric, sulfuric, phosphoric, acetic, tartaric, oxolic, citric, sulfamic, and mixtures thereof; injecting into the formation through a well bore a brine slug; injecting into the formation through the well bore slugs of aqueous thickened solutions comprised of thickening agents selected from the group consisting of partially hydrolyzed polyacrylamides, fatty acid soaps, sucrose, glycerin, polysaccharides, alkyl and hydroalkyl cellulose derivatives, carboxylmethyl cellulose, polyvinyl alcohol, polyvinyl pyrrolidone, polyacrylic acid, polystyrene sulfonates and ethyleneoxide polymers; terminating the injection of the aqueous thickened solutions; and recovering hydrocarbon fluids from the subterranean formation. Known polymeric water-flood additives can increase oil recovery from petroleum reservoirs by diverting water to unswept areas of the reservoir, by reducing water influx into producing wells and by decreasing the mobility ratio between the oil and driving fluid.

The examples included hereinbelow illustrate the method of the invention utilizing a partially hydrolyzed polyacrylamide, polysaccharide, and sodium carboxylmethyl cellulose thickened aqueous solutions. Example I demonstrates an application of the inventive steps of: (1) an acid pretreatment; (2) brine neutralization; and (3) a slug of thickened aqueous solution wherein the materials are injected through a well bore into a subterranean formation which is penetrated by at least one well bore for the purposes of reducing the amount of water recovered therefrom. Example II illustrates a modification of the inventive process through the steps of: (1) an acid pretreatment; (2) brine neutralization wherein the brine contains sodium dichromate; (3) a slug of polysaccharide thickened aqueous solution containing sodium hydrosulfite; (4) a brine slug containing sodium dichromate and sodium hydrosulfite; and (5) well shut in for a period of from 12–48 hours. Example III illustrates a proposed modification of the inventive process through the steps of: (1) an acid pretreatment; (2) brine neutralization; (3) a slug of sodium carboxylmethyl cellulose thickened containing potassium dichormate; (4) a brine slug containing sodium hydrosulfite; (5) a second slug of sodium carblxylmethyl cellulose thickened solution; (6) well shut in for a suitable period (1–3 days); and (7) return to production. Table I demonstrates the results of applying the process of Example I on a time-water-oil recovery basis.

EXAMPLE I

Arbuckle Limestone for formation in western Kansas

Production prior to treatment
  9 Barrels of oil per day and
  890 Barrels of water per day Treatment Process Steps
1. 500 gallons 15 percent HCl
2. 100 barrels of Arbuckle brine
3. 3,500 barrels of brine with 1000 ppm of a partially hydrolyzed polyacrylamide
4. shut in well for 48 hours
5. return to production

TABLE

Results of the Treatment Process of Example I

| Days after Return to Production | Daily Production Rate Barrels of Oil per Day | Barrels of Water per Day |
|---|---|---|
| 1 | 27 | 461 |
| 2 | 43 | 440 |
| 6 | 49 | 436 |
| 8 | 49 | 439 |
| 10 | 42 | 447 |
| 13 | 50 | 407 |
| 15 (Increased fluid withdrawal rate) | 79 | 585 |
| 16 | 68 | 617 |
| 17 | 73 | 659 |
| 18 | 60 | 644 |
| 24 | 54 | 736 |
| 45 | 48 | 752 |
| 59 | 37 | 794 |
| 75 | 32 | 758 |
| 89 | 24 | 766 |

— Production continued —

EXAMPLE II

Arbuckle Limestone formation in western Kansas

| Steps | Treatment Process |
|---|---|
| 1 | 750 Gallons of 15 percent HCl solution |
| 2 | 200 Barrels of Arbuckle brine containing 100 ppm (7 lbs. in 200 bbl.) of sodium dichromate |
| 3 | 1900 Barrels of brine with 1000 ppm of a polysaccharide (700 lbs.) containing 100 ppm (70 lbs.) of sodium hydrosulfite |
| 4 | 750 Barrels brine spacer slug containing 200 ppm (50 lbs.) of each sodium dichromate and sodium hydrosulfite |
| 5 | 1900 Barrels of brine with 1000 ppm of a polysaccharide (700 lbs.) containing 100 ppm sodium hydrosulfite |
| 6 | 500 Barrels of brine containing 200 ppm (35 lbs.) each of sodium dichromate and sodium hydrosulfite |
| 7 | Shut in well for 48 hours |
| 8 | Return to production |

EXAMPLE III

Burbank Sandstone formation in northern Oklahoma

| Steps | Treatment Process |
|---|---|
| 1 | 500 Gallons 15% HCl |
| 2 | 200 Barrles of ARk-Burbank brine |
| 3 | 2000 Barrels of brine with 1000 ppm of carboxymethylcellulose and 1500 ppm of potassium dichromate |
| 4 | 2000 Barrels of brine containing 1500 ppm of sodium hydrosulfite |
| 5 | 2000 Barrels of carboxymethylcellulose (1000–2500 ppm) |
| 6 | Shut in well (1–3 days) |
| 7 | Return to production. |

The results of applying the method of Example I as recorded in the table demonstrate an effective reduction in the water-to-oil ratio recovered from a subterranean formation. Before the application of the method of Example I which is in accordance with the invention, 9 barrels of oil and 890 barrels of water were produced per day from the Hendricks No. 2 well bore. An increase varying from 5 to 8 fold was achieved in the amount of oil produced while water production was reduced by approximately 50 to 20 percent during the first 90 days of production after being treated by the method of the invention. Proposed modifications of the invention are illustrated by Examples II and III, and are expected to produce similar results to those of the table.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

What we claim is:

1. A method for reducing the quantity of water recovered from a subterranean formation which is penetrated by at least one well bore, comprising;
   injecting into the formation through a well bore an acid slug; thereafter
   injecting into the formation through the well bore a brine slug; thereafter
   inJecting into the formation through the well bore at least one slug of thickened aqueous solutions;
   terminating the injection of the thickened aqueous solution; and
   recovering hydrocarbon fluids from the subterranean formation.

2. A method according to claim 1 wherein the acid solution slug is comprised of from 1 to 30 percent by weight of an acid selected from the group consisting of hydrochloric, hydrofluoric, sulfuric, nitric, phosphoric, acetic, tartaric, oxalic, acetic, and sulfamic.

3. A method according to claim 1 wherein the thickened aqueous solutions are comprised of thickeners selected from the group consisting of polyacrylic amide, carboxylmethylcellulose, polysaccharide, polyvinyl alcohol, polyvinyl pyrrolidone, polyacrylic, and polystyrene sulfonates, and ethylene-oxide polymers.

4. A method according to claim 1 wherein multiple slugs of thickened aqueous solutions of the same thickener are injected into the subterranean formation.

5. The method according to claim 4 wherein thickened aqueous solutions contain a reducing agent selected from the group consisting of sodium sulfite, sodium hydrosulfite, rhodium metabisulfite, potassium sulfite, sodium bisulfite, potassium metabisulfite, sodium sulfide, sodium thiosulfate, hydroquinone, ferrous chloride, hydrazine phosphite, and hydrazine dichlorate.

6. A method according to claim 1 wherein multiple slugs of thickened aqueous solutions comprised of at least two of the thickeners are injected into the subterranean formation.

7. A method according to claim 1 wherein the brine slug contains a polyvalent metal compound capable of being reduced to a lower valence selected from the group consisting of potassium permanganate, sodium permanganate, ammonium chromate, ammonium dichromate, alkali metal chromates, alkali metal dichromates, and chromium trioxide.

8. The method according to claim 6 wherein the brine slug contains a reducing agent selected from the group consisting of sodium sulfite, sodium hydrosulfite, rhodium metabisulfite, potassium sulfite, sodium bisulfite, potassium metabisulfite, sodium sulfide, sodium thiosulfate, hydroquinone, ferrous chloride, hydrazine phosphite, and hydrazine dichlorate.

9. The method according to claim 1 wherein the brine contains sodium dichromate; the thickening agents are selected from the group consisting of partially hyrolyzed polyacrylamide, polysaccharide, and sodium carboxy-methylcellulose; and the thickened aqueous solution contains sodium hydrosulfite.

* * * * *

UNITED STATES PATENT OFFICE

CERTIFICATE OF CORRECTION

Patent No. 3,757,863    Richard L. Clampitt and    Dated: September 11, 1973
James E. Curzon It is certified that error appears in the above-identified patent and that said Letters Patent are hereby corrected as shown below:

Column 2, line 40, cancel "hydroalkyl" and insert -- hydroxyalkyl --; column 2, line 41, cancel "polyvinyl alcohol, polyvinyl pyrrolidone," and insert -- poly(vinyl alcohol), poly(vinylpyrrolidone), --; column 2, line 42, cancel entire line and insert -- poly(acrylic acid), poly(acrylamide), poly(styrene sulfonates), --; column 2, lines 43-45 cancel entire lines and insert -- ethyleneoxide polymers, the various polymers of homologs of monomers, and copolymers of two or more monomers. --; column 2, line 46, cancel "polymers with other polymeric substances.". Column 3, line 42, cancel "MnO" and insert -- $MnO_2$ --. Column 4, line 39, cancel "oxolic" and insert -- oxalic --; column 4, line 47, after "derivatives," cancel rest of line and insert -- carboxylmethylcellulose, poly(vinyl alcohol), --; column 4, line 48, cancel entire line; column 4, line 49, cancel "rene sulfonates and ethyleneoxide" and insert -- poly(vinylpyrrolidone), poly(acrylic acid), poly(styrene sulfonates) and ethylene oxide --. Column 6, line 56, cancel first word "acetic" and insert -- citric --; column 6, line 60, after "polyacrylic" insert -- acid --.

Signed and sealed this 5th day of March 1974.

(SEAL)
Attest:

EDWARD M. FLETCHER, JR.
Attesting Officer

C. MARSHALL DANN
Commissioner of Patents